United States Patent
Vega et al.

(10) Patent No.: US 11,620,207 B2
(45) Date of Patent: Apr. 4, 2023

(54) POWER EFFICIENT MACHINE LEARNING IN CLOUD-BACKED MOBILE SYSTEMS

(71) Applicant: INTERNATIONAL BUSINESS MACHINES CORPORATION, Armonk, NY (US)

(72) Inventors: Augusto Vega, Mount Vernon, NY (US); Alper Buyuktosunoglu, White Plains, NY (US); Pradip Bose, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 614 days.

(21) Appl. No.: 16/736,959

(22) Filed: Jan. 8, 2020

(65) Prior Publication Data

US 2021/0208992 A1 Jul. 8, 2021

(51) Int. Cl.
*G06F 11/34* (2006.01)
*G06N 20/00* (2019.01)
*G06N 5/04* (2023.01)
*H04L 67/289* (2022.01)
*G06F 9/50* (2006.01)

(52) U.S. Cl.
CPC ........ *G06F 11/3433* (2013.01); *G06F 9/5088* (2013.01); *G06N 5/04* (2013.01); *G06N 20/00* (2019.01); *H04L 67/289* (2013.01)

(58) Field of Classification Search
None
See application file for complete search history.

(56) References Cited

U.S. PATENT DOCUMENTS

| | | | |
|---|---|---|---|
| 7,590,984 B2 | 9/2009 | Kaufman et al. | |
| 8,510,149 B1 | 8/2013 | He et al. | |
| 9,021,477 B2 | 4/2015 | Choudhury et al. | |
| 9,691,034 B2 | 6/2017 | Lee et al. | |
| 2015/0227741 A1 | 8/2015 | Permeh et al. | |
| 2017/0161638 A1 | 6/2017 | Garagic et al. | |
| 2017/0373955 A1 | 12/2017 | Kocoloski et al. | |
| 2018/0285751 A1 | 10/2018 | Oliva et al. | |
| 2018/0314742 A1 | 11/2018 | Taropa | |
| 2019/0005377 A1 | 1/2019 | Malaya | |
| 2019/0026634 A1 | 1/2019 | Homeyer et al. | |
| 2019/0042955 A1 | 2/2019 | Cahill et al. | |
| 2019/0138908 A1* | 5/2019 | Bernat | G06N 3/105 |
| 2020/0219007 A1* | 7/2020 | Byers | G06F 11/3409 |
| 2020/0267053 A1* | 8/2020 | Zheng | H04L 47/283 |
| 2021/0312316 A1* | 10/2021 | Lee | G06F 3/0647 |

(Continued)

OTHER PUBLICATIONS

U.S. Appl. No. 62/806,504, filed 2019).*

(Continued)

*Primary Examiner* — June Sison
(74) *Attorney, Agent, or Firm* — Griffiths & Seaton PLLC (57) ABSTRACT

Various embodiments are provided for load balancing of machine learning operations in a computing environment by a processor. One or more machine learning operations performing inference or training operations may by dynamically balanced between one or more edge computing devices in a wireless communication network and a cloud computing system for increasing performance of a selected metric.

20 Claims, 8 Drawing Sheets

(56) References Cited

U.S. PATENT DOCUMENTS

2021/0357268 A1* 11/2021 O'Donoghue ......... G06Q 10/10
2022/0237476 A1*  7/2022 Benjamin ............... H02J 3/003

OTHER PUBLICATIONS

"Edge-Cloud Collaborative Processing for Intelligent Internet of Things: A Case Study on Smart Surveillance." Mudassar et al.; DAC 2018. ( 6 Pages).
"Neurosurgeon: Collaborative Intelligence Between the Cloud and Mobile Edge." Kang et al.; ASPLOS 2017. ( 15 Pages ).
"Edge Intelligence: On-Demand Deep Learning Model Co-Inference with Device-Edge Synergy." ;Li et al.; MECOMM 2018. (6 Pages).
"MODI: Mobile Deep Inference Made Efficient by Edge Computing"; Ogden et al.; Worcester Polytechnic Institute; (7 Pages).
"JointDNN: An Efficient Training and Inference Engine for Intelligent Mobile Cloud Computing Services"; Eshratifar et al.; arXiv:1801.08618v1 [cs. DC]; Jan. 25, 2012; (12 Pages).
"Accelerating Machine Learning Inference With Probabilistic Predicates"; Lu et al.; (16 Pages).
"Cloud-Based or On-Device: An Empirical Study of Mobile Deep Inference"; Guo; arXiv:1707.04610v2 [cs.PF]; Arp. 15, 2018; (7 Pages).

* cited by examiner

POWER EFFICIENT MACHINE LEARNING IN CLOUD-BACKED MOBILE SYSTEMS

BACKGROUND OF THE INVENTION

Field of the Invention

The present invention relates in general to computing systems, and more particularly, to various embodiments for providing power efficient machine learning in cloud-backed mobile systems by a processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information. Processing devices, with the advent and further miniaturization of integrated circuits, have made it possible to be integrated into a wide variety of devices and computing systems, which may be associated with a variety of types of networks such as, for example, a wireless communication network.

Also, a popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for providing power efficient machine learning in cloud-backed mobile systems (e.g., load balancing of machine learning operations in a cloud computing and wireless communication network environment) in a computing environment by a processor are provided. In one embodiment, by way of example only, a method for load balancing of machine learning operations in a cloud computing and wireless communication network environment by a processor is provided. One or more machine learning operations performing an inference operations may by dynamically balanced between one or more edge computing devices in a wireless communication network and a cloud computing system for increasing performance of a selected metric.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

In today's computing environment, large amounts of data can be generated at the edge of a distributed (e.g., networked) computer system, which may include user interface devices, sensors, wireless adapters, and other such devices with computation and communication resources. Machine learning models can be built from data collected at edge nodes of the distributed computer system to enable the detection, classification, and prediction of future events.

Additionally, the demand for wireless services is increasing rapidly as evident by the tremendous growth in recent years in user equipment ("UE") (e.g., mobile device, internet of things ("IoT") devices, etc.) that allow a user not only to engage in wireless communication, but also to access data, such as e-mails, the internet, etc. Next generation cellular networks utilize more intelligent edge devices such as, for example, an eNodeB, which enjoys greatly enhanced computational and analytics capability in order to serve the mobile users' certain application and service requests at the edge rather than at the core network as in traditional cellular network systems.

Moreover, cloud-based mobile applications have become increasingly popular and one key issue therein is to ensure that services are always delivered with good performance. Current centralized structure of the cloud has led to a generally large geographical separation between the users and the cloud infrastructure. In such a setting, end-to-end communication between user and cloud can involve many network hops resulting in high latency; the ingress bandwidth to the cloud may also suffer from saturation as the cloud infrastructure is accessed on a many-to-one basis. A promising approach for resolving the above problems is to install computing infrastructures at the network edge.

For example, particularly for real-time applications such as instantaneous object recognition and safety assistance in intelligent transportation systems (ITS), service applications have to remain in relatively close proximity to their end users in order to ensure low latency and high bandwidth connectivity. This is captured by the newly emerged concept of mobile edge clouds ("MECs"), as well as similar concepts such as cloudlet, fog computing, follow-me cloud ("FMC"), mobile micro-cloud and small cell cloud. It should be noted that the FMC is a concept according to which services are migrating in unison with the user's movements. An MEC is to move computation closer to users, where small servers or data centers that can host cloud applications are distributed across the network and connected directly to entities (such as cellular base stations) at the network edge. A "server node" (or simply "server") may be defined as a cloud server providing compute and/or storage power for hosting virtual machines ("VMs") in a follow-me or mobile-edge cloud.

Thus, in general, users of various UE devices (e.g., smartphone, mobile phone, tablet computer, IoT devices, etc.) change their point of attachment in a cellular network (by movement or migration away from a cell tower of a cell region) and start getting served by a new edge-of-network application aware proxy server or "EdgeApp" server. A state in an edge application proxy/server, associated with the UE, may need to be migrated from an old EdgeApp server at the source node to a new EdgeApp server at a destination node.

Additionally, within both a cloud computing system, a networked system, and/or a wireless communication network, machine learning operations (e.g., Artificial Intelligence "AI" operations) may be performed by various computers/services, edge devices, or other computing devices. Such operations may significantly impact the overall computing efficiency of mobile edge device and even cloud computing system.

Accordingly, various embodiments are depicted for providing power efficient machine learning in cloud-backed mobile systems (e.g., load balancing of machine learning operations in a computing environment) by a processor. One or more machine learning operations performing an inference operations may by dynamically balanced between one or more edge computing devices in a wireless communication network and a cloud computing system for increasing performance of a selected metric.

In an additional aspect, various aspects provide power efficient machine learning within cloud-backed mobile cognition systems where mobile ("edge") devices execute machine learning applications with dynamic assistance from a cloud computing system. In one aspect, a load balancing operation may be performed for the execution of inference operations across both the cloud computing system and an edge network (e.g., wireless communication system). This level of adaptation results in significant power efficiency improvements compared to current all-or-nothing solutions, where inferences are executed either completely on the edge device or completely in the cloud. All-or-nothing approaches lack flexibility to adapt to environmental fluctuations (variable bandwidth, variable computation load on the edge device, etc.) while environmental changes can determine not only the performance, but also the power efficiency of the device-cloud system. Accordingly, various embodiments provide intelligent power efficient machine learning in cloud-backed mobile systems (e.g., load balancing of machine learning operations in a cloud computing and wireless communication network environment).

In an additional embodiment, the present invention provides for intelligent and dynamic execution balance of machine learning applications across computation devices to improve a metric of interest. The AI applications may be machine learning (ML) applications executing inference operations. The metric of interest may be used to improve performance/throughput, power efficiency, temperature or system reliability. One or more computation devices such as, for example, a mobile computation device and a cloud computation infrastructure may be used. The execution of the ML inference operations pertaining to the ML application may be dynamically balanced across the mobile computation device and the cloud computation infrastructure. The inference operations may be executed either on the mobile device or in the cloud based on a variable that holds information about the current execution platform (cloud, device or undefined).

The content of the variable (e.g., the content being what the variable is indicating) may be determined at run-time in the following operations. Step 1, the variable may be set as "undefined" at the beginning of the ML application execution. Step 2A, if the variable's current value is undefined, the ML application inference operation may be executed both in the cloud computing devices and on the edge device at the same time. Step 2B, if the ML application inference operation's execution time on the device is smaller than a pre-defined worst-case execution time, then the variable is set as "device". Alternatively, in Step 2C, if the ML application inference operation's execution time in the cloud computing system is smaller than the inference's execution time on the device, then the variable is set to "cloud." In step 2D, if none of these two comparisons holds, then the variable is set to device (e.g., set as "edge device"). Step 3, if the current platform executing the ML application inference operation is the cloud computing system, then the ML application inference operation is executed in the cloud computing system. In step 3B, if the bandwidth or the edge device central processing unit "CPU" frequency decrease, then the variable is set to undefined. Step 4, if the current platform executing the ML application inference operation is the edge device, then the ML application inference operation is executed on the edge device. In step 4B, if the bandwidth or the edge device CPU frequency increase, then the variable is set to undefined.

In an additional aspect, one or more different/various inference operations are simultaneously executed (in parallel) across computation devices to increase throughput.

It should be noted as described herein, the term "intelligent" (or "intelligence") may be relating to, being, or involving conscious intellectual activity such as, for example, thinking, reasoning, or remembering, that may be performed using machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor based devices or other computing systems that include audio or video devices). Intelligent or "intelligence" may also refer to identifying patterns of behavior, leading to a "learning" of one or more events, operations, or processes. Thus, an intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to an intelligent system. The intelligent system may be a specialized computer system, or set of computer systems, configured with hardware and/or software logic (in combination with hardware logic upon which the software executes) to emulate human intelligent/cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold), speed and resilience on a large scale. An intelligent system may perform one or more computer-implemented cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the intelligent/cognitive operation(s), examples of which include, but are not limited to, question answering, identifying problems, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, websites, online journals, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
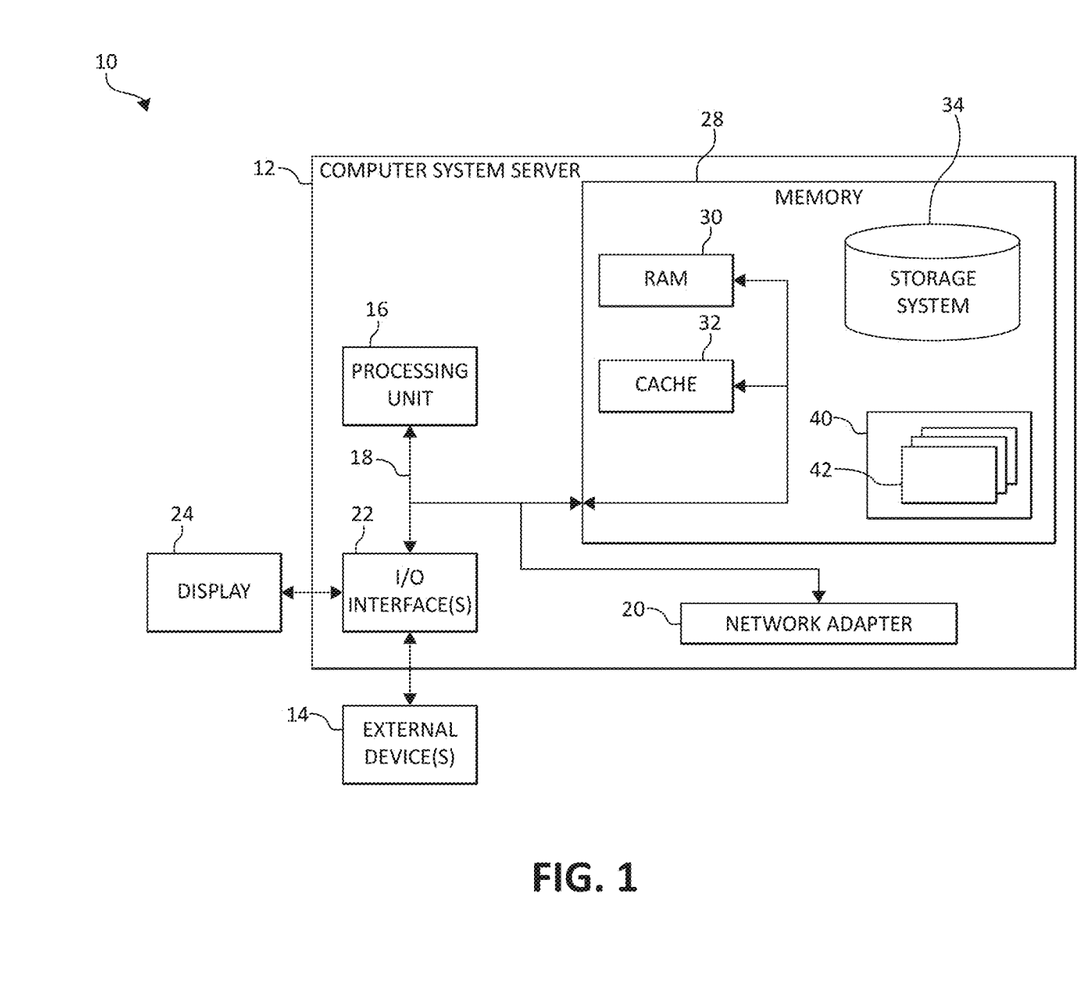
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
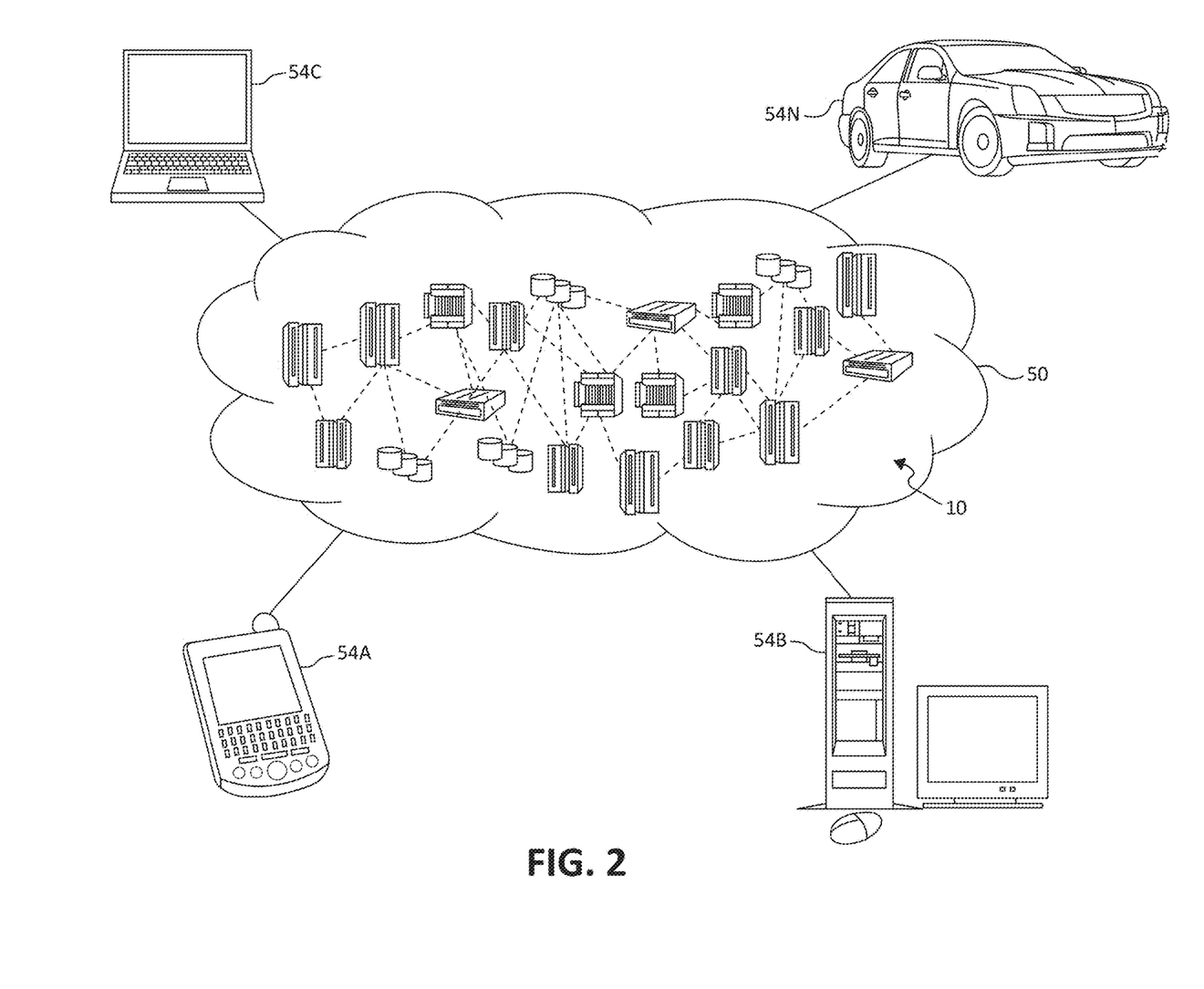
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
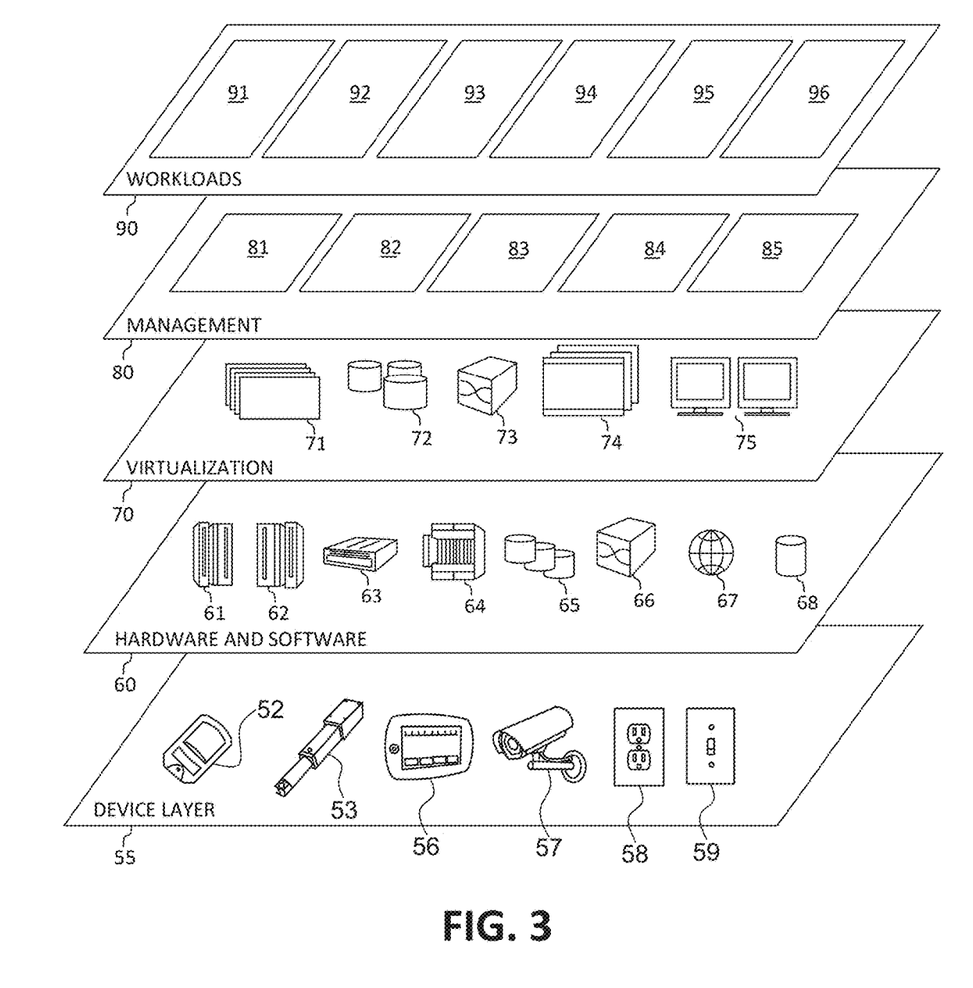
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing power efficient machine learning in cloud-back mobile systems. In addition, various workloads and functions 96 for providing power efficient machine learning in cloud-back mobile systems may include such operations as data analysis (including data collection and processing from various vehicular or environmental sensors), collaborative data analysis, and predictive data analytics functions. One of ordinary skill in the art will appreciate that the workloads and functions 96 for providing power efficient machine learning in cloud-back mobile systems may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
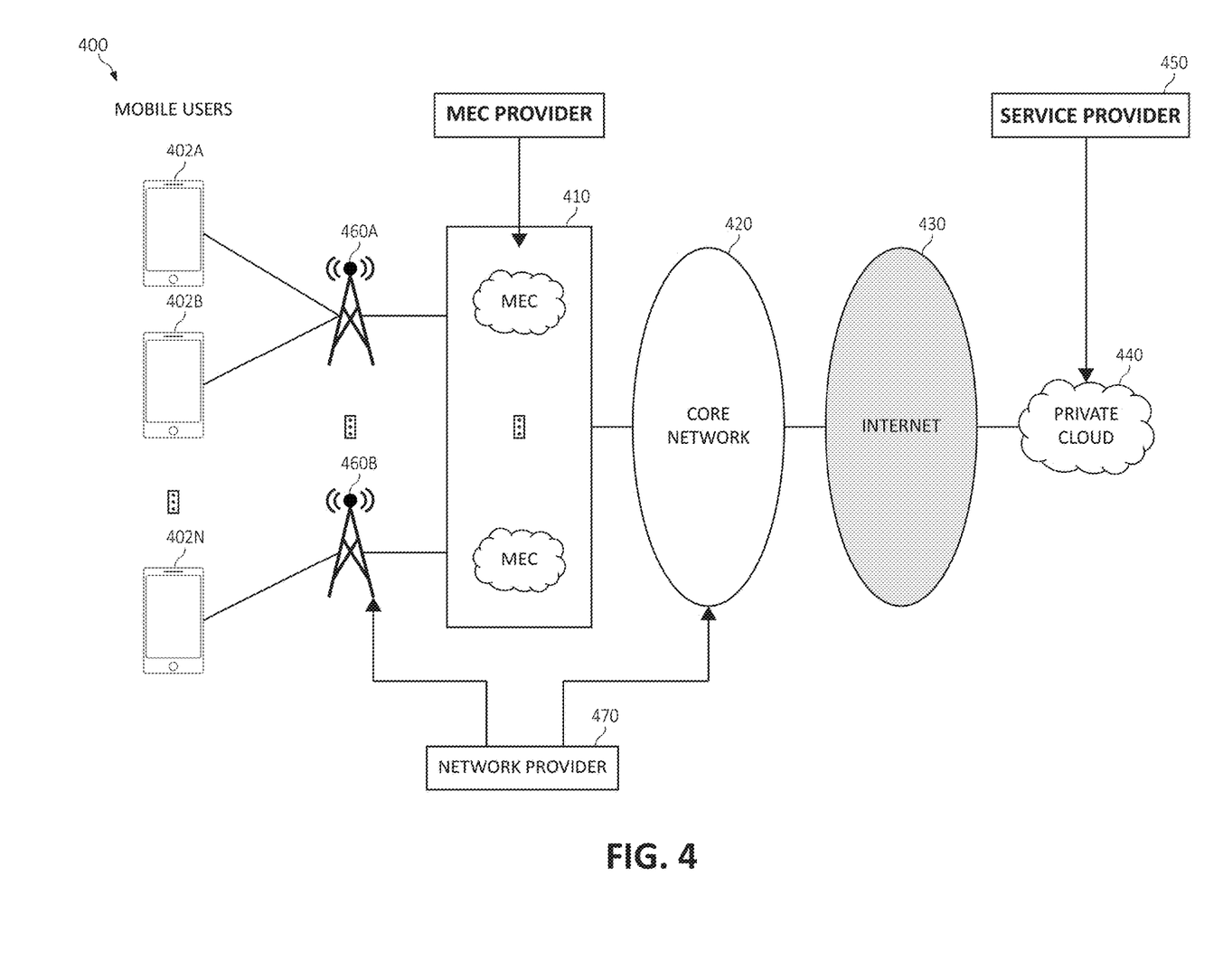
FIG. 4 is a diagram illustrating an exemplary wireless network in which the present techniques may be implemented according to an embodiment of the present invention.

Turning now to FIG. 4, a diagram is depicted illustrating an exemplary wireless network 400 such as, for example, a mobile edge clouds (MEC) computing environment according to an example of the present technology. As will be seen, many of the functional blocks may also be considered "modules" or "components" of functionality, in the same descriptive sense as has been previously described in FIGS. 1-3. With the foregoing in mind, the module/component blocks of wireless network 400 may also be incorporated into various hardware and software components of a system.

The wireless network 400 may include the one or more UE's 402A-N (e.g., an edge device such as, for example, the UE, an IoT device, vehicle, smart phone, computer, tablet, etc.), one or more devices 460A-B (e.g., base stations/Evolved Universal Terrestrial Radio Access Network (E-UTRAN) Node Bs (also commonly denoted as evolved Node Bs, enhanced Node Bs, eNodeBs, or eNBs)), a core network 420, a service provider 450, a cloud computing environment 440, and internet 430. The core network 420 and the one or more devices 460A-B may be a network provider. The MEC 410 (e.g., MEC provider) may be small clouds that offer a limited set of cloud services via a service provider 450 from the one or more devices 460A-B of the mobile network. The core network 420 and the one or more devices 460A-B may be a network provider. That is, the wireless network 400 may include the network provider 470 (e.g., the core network 420 and the one or more devices 460A-B), the MEC provider 410, and the service provider 450.

When one or more of the UE 402A-402N (e.g., edge users/mobile user/vehicle) requests arrives at a network (e.g., network provider 470), one or more of the one or more devices 460A-B may first check whether the requested application or service is available locally, or whether it can be launched locally using remaining CPU or memory resources. An MEC server 410 may, for example, refer to the service provider 450 that has the ability to run IT services/services at the edge of mobile Radio Access Network (RAN) based on the concepts of cloud computing, which may be provided by the internet 430 and the cloud computing environment 440 (e.g., private cloud). It should be noted that one or more types of networks may be applied as used herein. In one aspect, by way of example only, a network, as referred to herein, may be applied with three "layers": 1) mobile users, 2) MECs, and 3) a private cloud. A balancing of inference operations may be performed across these three layers.

The term "edge" in this context may, for example, mean the one or more devices 460A-B and servers within the RAN, or the one or more UE's 402A-402N. The presence of the MEC 410 (e.g., MEC server) at the edge of the one or more devices 460A-B may allow exposure to real-time radio and network information (such as subscriber location, cell load, etc.) that can be leveraged by applications and services of service provider 450 to offer context-related services to one or more one or more of the UE 402A-402N (e.g., edge users/mobile user/vehicle). Thus, the MEC 410 enables running applications and performing related processing tasks closer to the one or more of the UE 402A-402N by the MEC 410 (e.g., MEC application server) being deployed at the one or more devices 460A-B that is part of a cellular/wireless communication.

As previously mentioned, the mechanisms of the illustrated embodiments provide novel approaches for an intelligent system to provide power efficient machine learning in cloud-backed mobile systems (e.g., load balancing of machine learning operations) in a computing environment such as, for example, in a wireless network 400 of FIG. 4. One or more machine learning operations performing an inference operations may by dynamically balanced between one or more edge computing devices in a wireless communication network and a cloud computing system for increasing performance of a selected metric.

Figure 5:
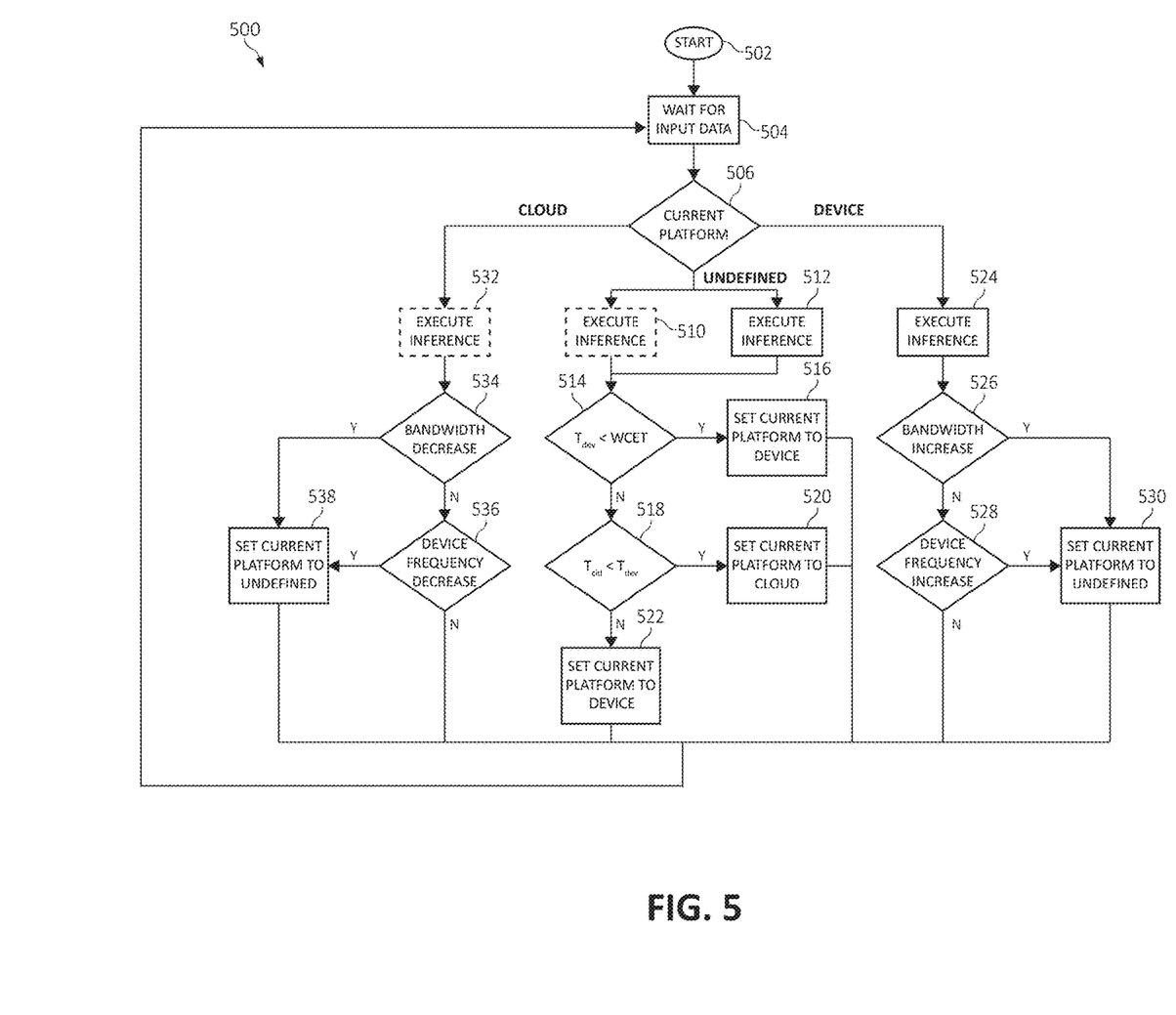
FIG. 5 is a flowchart diagram of an exemplary method for load balancing of machine learning operations by a processor in which various aspects of the present invention may be realized FIG. 6 are graph diagrams illustrating results of load balancing of machine learning operations according to an embodiment of the present invention.

Turning now to FIG. 5, a method 500 for power efficient machine learning in cloud-backed mobile systems (e.g., load balancing of machine learning operations) in a computing environment by a processor is depicted, in which various aspects of the illustrated embodiments may be implemented. In one aspect, one or more of the components, modules, services, applications, and/or functions described in FIGS. 1-4 may be used in FIG. 5. The functionality 500 may start in block 502. In one aspect, operations described herein may be employed using a mobile edge device (e.g., an on-board computing system in a vehicle executing the machine learning operations and connected to a cloud computing system).

Starting in block 502, a waiting operation may be performed to wait for input data, as in block 504. For example, the on-board computing system in the vehicle may wait for images captured from one or more computing image capturing devices (e.g., camera) on the vehicle.

A determination operation may be performed to determine where machine learning inference operations are to be performed (e.g., determine the current platform either on the mobile edge device or cloud computing system), as in block 506. In one aspect, from block 506, the current platform may be set as "undefined" and thus the machine learning inference operations may be performed in both the mobile edge device and cloud computing system, as in blocks 510 (cloud computing system or "cloud") and 512 (mobile edge device or "device"). From blocks 510 and 512, the method 500 may move to block 514. (It should be noted that by way of example/illustration only, the "dashed" boxes of blocks 510 and 532 illustrate operations executed in the cloud computing system).

A determination operation may be executed to determine if the time to execute the machine learning inference operations in the device (e.g., $T_{dev}$) is less than the worst-case execution time ("WCET"), as in block 514. The WCET may be a defined time parameter indicating a maximum amount of time to perform the machine learning inference operation.

If yes from block 514, the current platform (for performing the machine learning inference operation) may be set as the device (e.g., set as "device"), as in block 516. From block 516, the method 500 may move to block 504 and wait for input data.

If no from block 514, a determination operation may be executed to determine if the time to execute the machine learning inference operations in the cloud computing system (e.g., $T_{cld}$) is less than the time to execute the machine learning inference operations in the device (e.g., $T_{dev}$), as in block 518. If yes from block 518, the current platform (for performing the machine learning inference operation) may be set as the cloud computing system (e.g., set as "cloud"), as in block 520. If no from block 518, the current platform (for performing the machine learning inference operation) may be set as the device (e.g., set as "device"), as in block 522. From blocks 520 and/or 522, the method 500 may move to block 504 and wait for input data.

Returning now to block 506, if the current platform may be set as "cloud" the machine learning inference operations may be performed in the cloud computing system, as in blocks 532 (cloud computing system or "cloud"). A determination operation may be executed to determine if the bandwidth has decreased, as in block 534. If yes, the current platform (for performing the machine learning inference operation) may be set to "undefined", as in block 538. From block 538, the method 500 may move to block 504 and wait for input data.

If no from block 534, a determination operation may be executed to determine if the device frequency has decreased, as in block 536. If yes, the current platform (for performing the machine learning inference operation) may also be set to "undefined", as in block 538. If no from block 536, the method 500 may move to block 504 and wait for input data.

Returning now to block 506, if the current platform may be set as "device" the machine learning inference operations may be performed in the device, as in blocks 524. A determination operation may be executed to determine if the bandwidth has increased, as in block 526. If yes, the current platform (for performing the machine learning inference operation) may be set to "undefined", as in block 530. From block 530, the method 500 may move to block 504 and wait for input data.

If no from block 526, a determination operation may be executed to determine if the device frequency has increased, as in block 528. If yes, the current platform (for performing the machine learning inference operation) may also be set to "undefined", as in block 530. If no from block 528, the method 500 may move to block 504 and wait for input data. The functionality 500 may end, as in block 542 (or may even return to block 504).

Thus, in summary, method 500 may execute on an edge device (except for the dash-lined boxes, that execute in the cloud), and execution of machine learning inference operations may be triggered upon the reception of input (sensor) data. A variable may be maintained that determines the current execution platform: cloud, device or undefined. The current execution platform is dynamically determined based on environmental characteristics such as, for example, device-cloud communication bandwidth, and the device CPU frequency.

Figure 6:
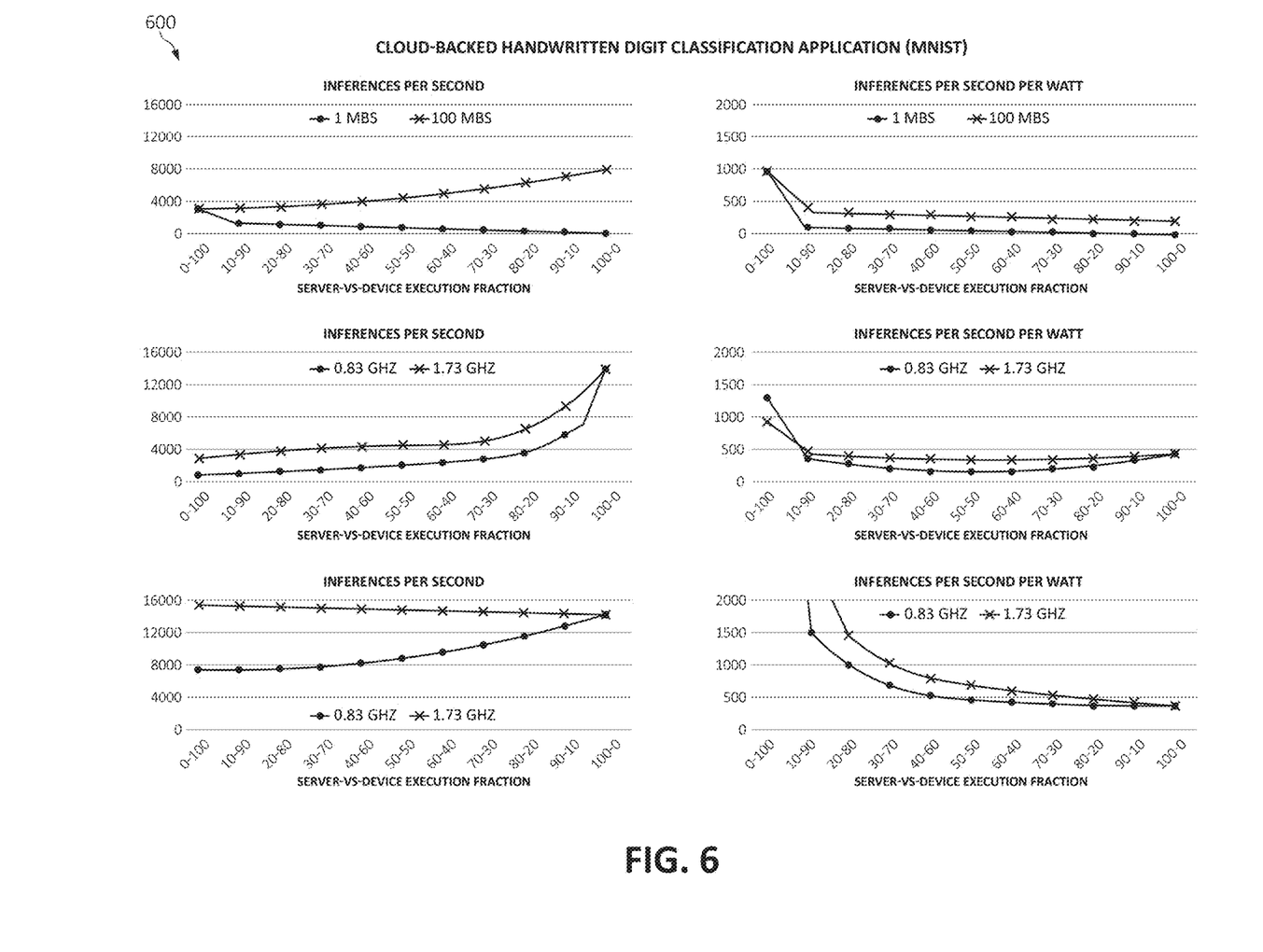

Turning to FIG. 6, graph diagrams are depicted illustrating results of load balancing of machine learning operations. In one aspect, one or more of the components, modules, services, applications, and/or functions described in FIGS. 1-5 may be used for generating results of FIG. 6, which may be employed in a cloud-backed handwritten digit classification application (e.g., Modified National Institute of Standards and Technology database ("MNIST") dataset).

As depicted in each graph diagram, results of load balancing inference operations performed by machine learning operations such as, for example, inferences per second and inferences per second per Watt, using different device-cloud connection bandwidths (e.g. 1 and 100 megabits per second ("Mbps")) and different edge device CPU frequencies (e.g. 0.83 and 1.73 gigahertz ("GHz")).

As depicted, the present invention may dynamically "decide" where to execute inferences (e.g., on the edge device or cloud) to reduce power consumption while sustaining high inference throughput. The available bandwidth ("BW") to a cloud computing system and the central processor unit ("CPU") frequency of the edge device may be tracked and monitored to guide the load balancing decisions. For example, if the connection bandwidth of the edge device to the cloud computing system is large enough, one or more complex machine learning/artificial intelligence models may exhibit higher throughput when execution occurs in the cloud computing system. If the connection bandwidth of the edge device to the cloud computing system is not large enough, one or more complex machine learning/artificial intelligence models may exhibit higher power efficiency when execution occurs on the edge device. Also, variable computation load on the edge device can result in dynamic voltage and frequency scaling ("DVFS") activation, altering the power efficiency of the edge device CPU.

As depicted, the Y-axis of each graph depicts either 0 to 16000 inferences per second (e.g., the graphs on the left hand side of FIG. 6) or 0 to 2000 inferences per second watt (e.g., the graphs on the right hand side of FIG. 6). The X-axis depicts the transitioning from inference operations performed by machine learning operations on edge devices only (e.g., 0-100, expressed in units of percentage ("%")) to the inference operations performed by machine learning operations on the cloud computing systems (e.g., 100-0, expressed in units of percentage ("%")), with other cases in between where part of the inference operations are performed on the edge device and part of the inference operations are performed on the cloud computing system.

Figure 7:
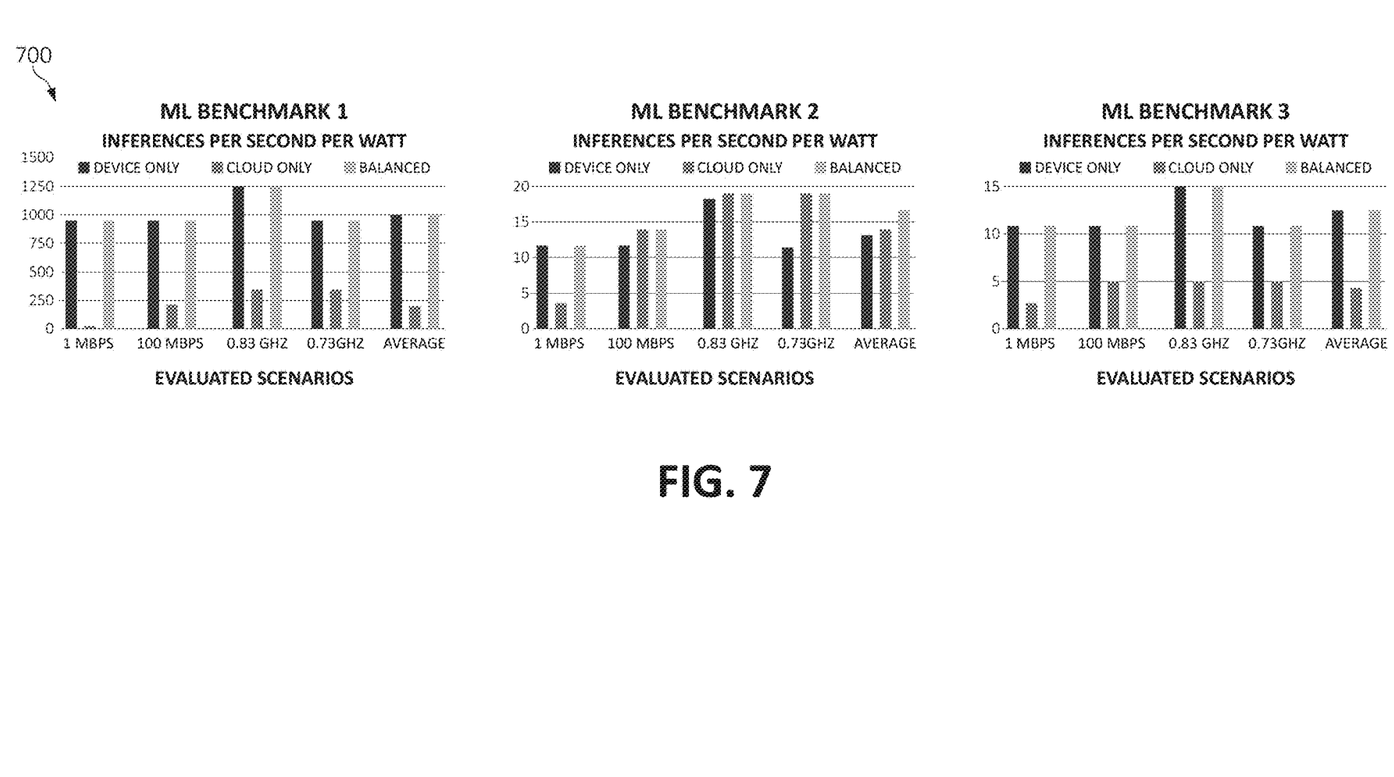
FIG. 7 are additional graph diagrams illustrating results of load balancing of machine learning operations according to an embodiment of the present invention.

FIG. 7 are graph diagrams 700 illustrating results of load balancing of machine learning operations according to an embodiment of the present invention. In one aspect, one or more of the components, modules, services, applications, and/or functions described in FIGS. 1-5 may be used for generating results of FIG. 7, which may be employed in one or more machine learning ("ML") benchmarks such as, for example, ML benchmark 1 ("MNIST"), ML benchmark 2 (Internet Movie Database "IMDB"), and/or ML benchmark 3 ("bAbI").

As depicted in each of the graph diagrams 700 of FIG. 7, power efficiency of the ML benchmark 1, ML benchmark 2, and/or ML benchmark 3 applications are for three execution setups: 1) running/executing entirely on the device (Device Only), 2) running/executing entirely in the cloud (cloud computing system only), and 3) using the proposed heuristic (e.g., graph results labeled as "balanced") of the present invention to dynamically balance the execution of inferences (e.g., load balancing between the cloud computing system and the mobile edge device).

As depicted in graph diagrams 700 of FIG. 7, the heuristic ("balanced") of the present invention effectively determines where to execute inferences in order to maximize the overall power efficiency of the device-cloud system. As depicted, the "balanced" heuristic matches the benefits of the "device only" and "cloud only" operations, even under environmental fluctuations like variable bandwidth and device CPU frequency.

Figure 8:
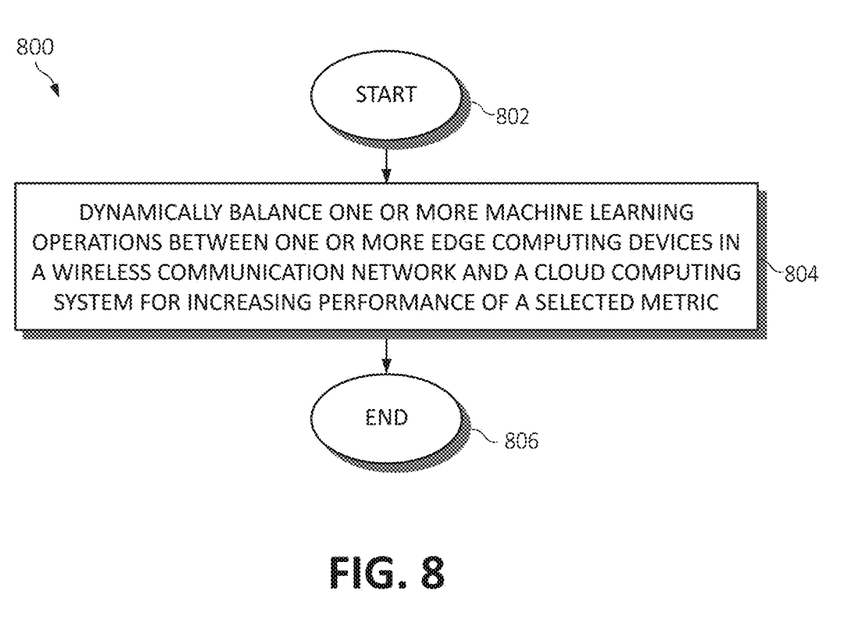
FIG. 8 is a flowchart diagram of an exemplary method for load balancing of machine learning operations by a processor, in which various aspects of the present invention may be realized.

Turning now to FIG. 8, a method 800 for load balancing of machine learning operations in a computing environment by a processor is depicted, in which various aspects of the illustrated embodiments may be implemented. In one aspect, one or more of the components, modules, services, applications, and/or functions described in FIGS. 1-4 may be used in FIG. 8. The functionality 800 may start in block 802.

One or more machine learning operations performing an inference operations may be dynamically balanced between one or more edge computing devices in a wireless communication network and a cloud computing system for increasing performance of a selected metric, as in block 804. The functionality 800 may end, as in block 806.

In one aspect, in conjunction with and/or as part of at least one block of FIG. 8, the operations of 800 may include each of the following. The operations of 800 may select as the selected metric a power metric, temperature metric, a performance metric, data throughput metric, or a combination thereof.

The operations of 800 may perform an inference operation by the one or more machine learning operations. The operations of 800 may perform a training operation by the one or more machine learning operations. The operations of 800 may determine whether the one or more machine learning operations executing on the one or more edge computing devices, the cloud computing system, or a combination thereof according to a variable.

The operations of 800 may set the variable as the edge computing device, the cloud computing system, or a combination thereof for indicating a current platform performing the inference operation. The operations of 800 may set the variable as the edge computing device, the cloud computing system, or a combination thereof according to one or more rules, conditions, or metrics. The operations of 800 may simultaneously perform one or more similar or different inference operations on both the one or more edge computing devices and the cloud computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for load balancing of machine learning operations in a computing environment comprising:
dynamically balancing one or more machine learning operations between one or more edge computing devices in a wireless communication network and a cloud computing system for increasing performance of a selected metric, wherein a variable of the one or more machine learning operations is used to determine which of the one or more edge computing devices and the cloud computing system executes the one or more machine learning operations based on an execution time and a predefined threshold, and wherein the variable having an undefined value causes the one or more machine learning operations to execute on both the one or more edge computing devices and the cloud computing system.

2. The method of claim 1, further including selecting as the selected metric a power metric, temperature metric, a performance metric, data throughput metric, or a combination thereof.

3. The method of claim 1, further including performing an inference operation or training operation by the one or more machine learning operations.

4. The method of claim 1, further including determining whether the one or more machine learning operations are executing on the one or more edge computing devices, the cloud computing system, or a combination thereof according to the variable.

5. The method of claim 4, further including setting the variable as the edge computing device, the cloud computing system, or a combination thereof for indicating one or more current platforms performing an inference operation.

6. The method of claim 4, further including setting the variable as the edge computing device, the cloud computing system, or a combination thereof according to one or more rules, conditions, or metrics.

7. The method of claim 1, further including simultaneously performing one or more similar or different inference operations on both the one or more edge computing devices and the cloud computing system.

8. A system for load balancing of machine learning operations in a computing environment, comprising:
one or more computers with executable instructions that when executed cause the system to:
dynamically balance one or more machine learning operations between one or more edge computing devices in a wireless communication network and a cloud computing system for increasing performance of a selected metric, wherein a variable of the one or more machine learning operations is used to determine which of the one or more edge computing devices and the cloud computing system executes the one or more machine learning operations based on an execution time and a predefined threshold, and wherein the variable having an undefined value causes the one or more machine learning operations to execute on both the one or more edge computing devices and the cloud computing system.

9. The system of claim 8, wherein the executable instructions further select as the selected metric a power metric, temperature metric, a performance metric, data throughput metric, or a combination thereof.

10. The system of claim 8, wherein the executable instructions further perform an inference operation or training operation by the one or more machine learning operations.

11. The system of claim 8, wherein the executable instructions further determine whether the one or more machine learning operations are executing on the one or more edge computing devices, the cloud computing system, or a combination thereof according to the variable.

12. The system of claim 11, wherein the executable instructions further set the variable as the edge computing device, the cloud computing system, or a combination thereof for indicating one or more current platforms performing an inference operation.

13. The system of claim 8, wherein the executable instructions further set the variable as the edge computing device, the cloud computing system, or a combination thereof according to one or more rules, conditions, or metrics.

14. The system of claim 8, wherein the executable instructions further simultaneously perform one or more similar or different inference operations on both the one or more edge computing devices and the cloud computing system.

15. A computer program product for load balancing of machine learning operations in a computing environment by a processor, the computer program product comprising a non-transitory computer-readable storage medium having computer-readable program code portions stored therein, the computer-readable program code portions comprising:
an executable portion that dynamically balances one or more machine learning operations between one or more edge computing devices in a wireless communication network and a cloud computing system for increasing performance of a selected metric, wherein a variable of the one or more machine learning operations is used to determine which of the one or more edge computing devices and the cloud computing system executes the one or more machine learning operations based on an execution time and a predefined threshold, and wherein the variable having an undefined value causes the one or more machine learning operations to execute on both the one or more edge computing devices and the cloud computing system.

16. The computer program product of claim 15, further including an executable portion that selects as the selected metric a power metric, temperature metric, a performance metric, data throughput metric, or a combination thereof.

17. The computer program product of claim 15, further including an executable portion that performs an inference operation or training operation by the one or more machine learning operations.

18. The computer program product of claim 15, further including an executable portion that determines whether the one or more machine learning operations are executing on the one or more edge computing devices, the cloud computing system, or a combination thereof according to the variable.

19. The computer program product of claim 18, further including an executable portion that:
set the variable as the edge computing device, the cloud computing system, or a combination thereof for indicating one or more current platforms performing an inference operation; or
set the variable as the edge computing device, the cloud computing system, or a combination thereof according to one or more rules, conditions, or metrics.

20. The computer program product of claim 15, further including an executable portion that simultaneously performs one or more similar or different inference operations on both the one or more edge computing devices and the cloud computing system.

* * * * *